Nov. 7, 1939.  J. L. BROWN  2,179,321
ANTIFRICTION BEARING OILER
Filed July 10, 1937
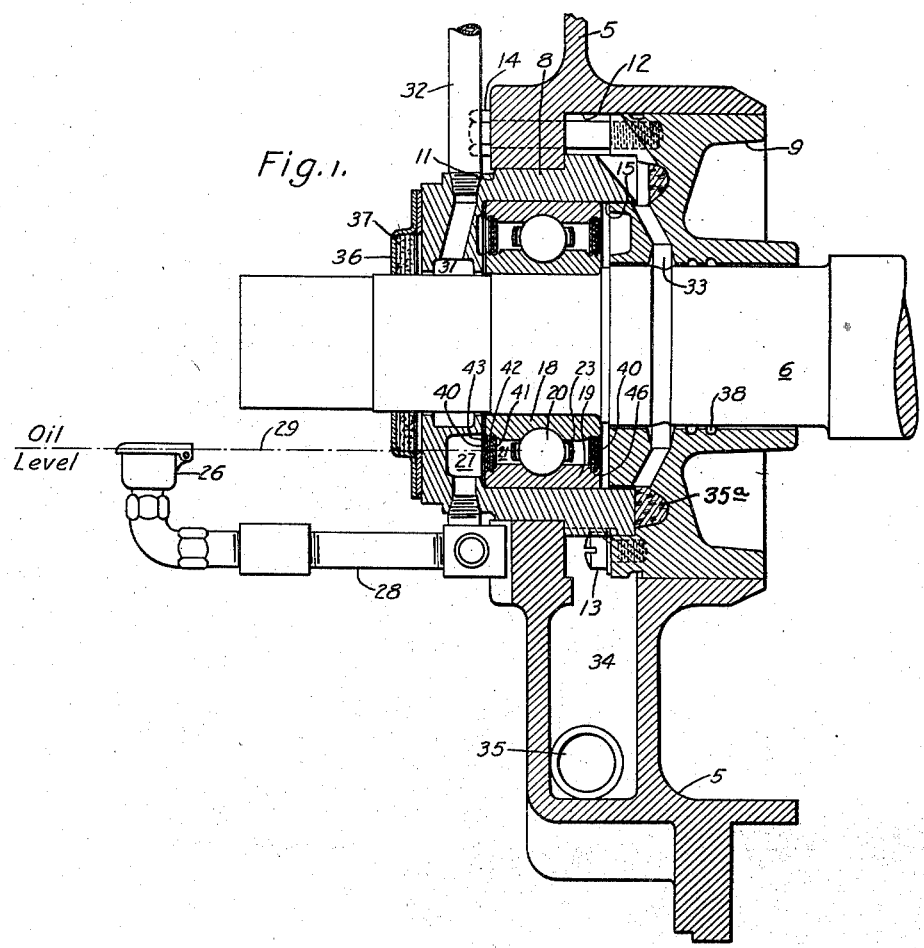
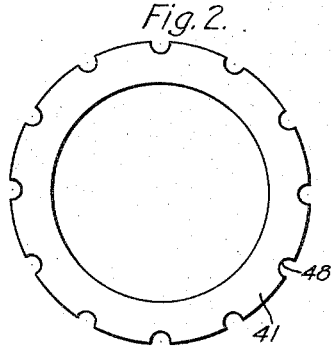
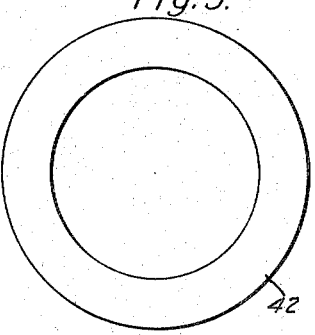
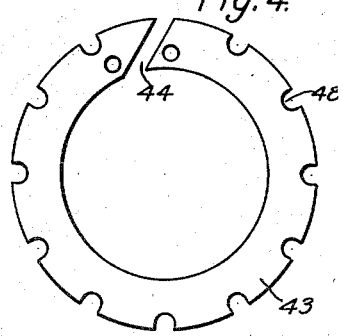
WITNESSES:
INVENTOR
John L. Brown
BY
ATTORNEY Patented Nov. 7, 1939

2,179,321

UNITED STATES PATENT OFFICE 2,179,321

ANTIFRICTION BEARING OILER

John L. Brown, Verona, Pa., assignor to Westinghouse Electric & Manufacturing Company, East Pittsburgh, Pa., a corporation of Pennsylvania Application July 10, 1937, Serial No. 152,930

4 Claims. (Cl. 308—187)

This invention relates to the oiling of antifriction bearings such as roller or ball bearings, and it has particular relation to antifriction bearings which are lubricated by a liquid oil and which are designed to be utilized for guiding a horizontal shaft of an electrical machine or other machine in which the escape of oil is to be guarded against, either because of the deleterious effect of the escaped oil on the machinery in question, or because of the necessity for more frequent renewals of the oil.

Antifriction bearing assemblies of the class in question usually consist of a bearing housing, within which is seated the antifriction bearing proper, the latter comprising inner and outer races, with a plurality of antifriction means (either balls or rollers) therebetween. When such bearings are lubricated by liquid oil (as distinguished from grease), it is desirable for the antifriction members to dip down into the oil, at the lowest point of their rolling-movement, and this inevitably results in creating an oil spray or mist consisting either of finely atomized liquid particles, or gaseous vapors, or both, all of which conditions are referred to as a non-liquid state, as distinguished from the true liquid state in which the particles of the liquid adhere together.

Bearings of the type just described have heretofore been subject to a certain loss of oil in the non-liquid state, due to the fact that the inside of the bearing housing, above the liquid oil level, was always filled with this oil spray or vapor. In all such bearing assemblies, there must be some provision for at least some passage of air through the bearing housing, either by reason of "breathing" due to thermal expansions and contractions, or by reason of a difference in air-pressure inside and outside of the machine on which the bearing is located; and whenever air passes out of a space which is filled with oil spray or vapors, it inevitably carries some of that oil with it.

It is the principal object of my invention to provide a bearing of the type described, in which the oil spray or vapors are confined to the space between the inner and outer races of the antifriction bearing proper, so that the inner walls of the bearing housing are relatively dry above the liquid oil level, and so that substantially no oil in non-liquid form is present in any portion of the bearing housing, except in the annular space within which the antifriction members are located, between the two races.

With the foregoing and other objects in view, my invention consists in the parts, combinations, systems and methods hereinafter described and claimed and illustrated in the accompanying drawing, wherein:

Figure 1 is a longitudinal view of a bearing assembly embodying my invention, and Figs. 2, 3 and 4 are elevational views of three of the parts utilized in the construction shown in Fig. 1.

By way of example, my invention is illustrated, in Fig. 1, in a form which hase been designed for an explosion-resisting alternating-current motor, of which the end-bracket 5 and the horizontal shaft 6 are shown on the drawing. The bearing housing is constructed in two parts, comprising the cartridge 8 and the inner bearing-cap or housing-cover 9, which together make up the bearing housing, and which are seated in openings 11 and 12 in the motor end-bracket 5. For convenience in handling, the two bearing-housing parts 8 and 9 are normally lightly held together by any suitable means 13, and in service they are tightly held together and to the end-bracket 5 by means of bolts 14.

The cartridge 8 of the bearing housing is provided with a bore 15 within which is seated the antifriction bearing proper. This antifriction bearing consists of an inner race 18 which is seated on the shaft 6, an outer race 19 which is seated in the bore 15 of the bearing housing, and a plurality of balls or other anti-friction members 20 which are disposed within the annular space 21 between the two races, the balls being held in separated positions by means of a retainer or cage 23, which serves also as a means for holding the races and balls in a unitary assembly.

My bearing is designed for lubrication with liquid oil which is introduced into an oil cup 26 which is connected to the space 27 within the bearing housing by means of suitable piping 28. The oil level is maintained at some value between the top of the oil cup 26, as indicated by the broken line 29, and some lower point which must nevertheless be sufficiently high to permit the oil to reach the antifriction members 20.

In accordance with a common practice, the illustrated bearing assembly is provided with an outer chamber 31 which is connected to atmosphere by means of a pipe 32, and an inner chamber 33 the top portion of which is connected to a sump 34 which is, in turn, connected to atmosphere through an opening 35. The bottom portion of the chamber 33 is closed by a cork or other oil-tight gasket 35a, providing a chamber in which the oil level 29 of relatively non-agitated oil is maintained. Also in accordance with an old practice, the bearing housing is provided, on its outer end, with a dust cap 36 containing a felt washer 37, and is further provided, on its inner end, with some sort of means 38 for retarding the creepage of oil along the shaft 6 toward the inside of the machine.

In accordance with my invention, I provide a bearing assembly such as that which has been described and illustrated, with the addition of two annular closure-means or filtering means 40, one being disposed at each end of the antifriction bearing proper, and preferably within the annular space 21 between the inner and outer races 18 and 19. Each of the closure or filter means 40, in the form shown in the drawing, consists of three parts—an inner washer 41 (Fig. 2) of steel or other material impervious to the passage of oil in either liquid or vaporous form, a filtering washer 42 (Fig. 3) of felt or other filtering material, and an outer impervious material washer 43 (Fig. 4) which is preferably a snap washer made of spring steel or other suitable material and having a break 44 therein, as illustrated in Fig. 4, in order to enable the washer to be snapped into place within a depression 46 in the outer race 19, as shown in Fig. 1. In accordance with my invention it is essential that both of the non-pervious washers 41 and 43 shall be provided with peripheral notches 48 or other axially extended openings for permitting a relatively free and positive axial flow or entrance of oil into the annular chamber 21 between the two races, so that the oil level within this chamber is maintained at substantially the same level as the oil level 29 outside of said chamber.

In operation, each closure or filter member 40 operates like a valve or membrane which is pervious to oil in the liquid state but which is substantially impervious to oil in the non-liquid state. In other words, relatively non-agitated liquid oil can readily pass through said closure or filter members 40, being incidentally filtered in the process, the main point being, however, that the oil gets through, it being assumed that the oil has previously been suitably filtered. Within the annular chamber 21 between the two races, the oil is violently agitated by the movement of the balls 20, so that this chamber, except for the extreme bottom portion which is filled with liquid oil, becomes heavily saturated with an oil spray or vapor, which I designate as oil in the non-liquid state. This oil in the non-liquid state cannot pass out of the chamber 21 through the felt washers 42 without being condensed or coalesced into a true liquid form, in the capillary interstices between the fibers of the felt, so that no oil gets through these washers in the form of an oil vapor or mist, thus preventing the escape of oil due to air-movements within the bearing housing, as previously explained.

While I have illustrated my invention and explained its mode of operation in connection with a single preferred form of embodiment, it should be obvious that many departures are possible in matters of detail, and I desire it to be distinctly understood that the invention is by no means limited to the particular details shown. I desire, therefore, that the appended claims shall be accorded the broadest construction consistent with their language and the prior art.

I claim as my invention:

1. An antifriction bearing assembly for guiding a substantially horizontal shaft, comprising a bearing housing having a bore for seating the bearing, an antifriction bearing having an inner race seated on the shaft, an outer race seated in the bore of the bearing housing, and a plurality of antifriction members between said races, lubricating means for maintaining a relatively non-agitated body of liquid oil in the lower part of the bearing housing below the shaft at both ends of the outer race and up to a level at least sufficient to reach the antifriction members, with a gaseous medium relatively free of oil-spray above the level of the relatively non-agitated liquid oil at both ends of the outer race, and a substantially vertically disposed filtering means disposed within the annular space between said races, at each end of said space, each of said filtering means comprising a substantially uninterrupted filtering washer substantially bridging said annular space between said races, and one or more washers of a material substantially impervious to the passage of oil in any form, all of said impervious-material washers having one or more axially extending peripheral openings therein for permitting the axial flow of liquid oil from the main body of oil in the bearing housing into said annular space between the races.

2. An oil-lubricated anti-friction bearing for a substantially horizontal shaft, comprising a bearing-housing, an inner race, an outer race, a plurality of rolling anti-friction members in the annular space between said races, oil-supplying means for supplying liquid oil to the annular space between said races in such manner that the liquid oil occupies only a small portion of said annular space while the remainder of said annular space is filled, in operation, with a heavily charged atmosphere containing an oil vapor or mist, means outside of the respective ends of the annular space between said races for providing chambers including lower portions containing relatively non-agitated liquid oil surmounted by upper portions containing an atmosphere which is relatively free of oil vapor or mist, means for providing a communication between said upper portions and the atmosphere outside of the bearing-housing, and a filter-barrier across the oil-charged atmosphere at each end of the annular space between the races for substantially preventing the passage of oil vapor or mist from the annular space between the races to the chambers at the ends thereof.

3. An oil-lubricated anti-friction bearing for a substantially horizontal shaft, comprising a bearing-housing, an inner race, an outer race, a plurality of rolling anti-friction members in the annular space between said races, oil-supplying means for supplying liquid oil to the annular space between said races in such manner that the liquid oil occupies only a small portion of said annular space while the remainder of said annular space is filled, in operation, with a heavily charged atmosphere containing an oil vapor or mist, means outside of one end of the annular space between said races for providing a chamber including a lower portion containing relatively non-agitated liquid oil surmounted by an upper portion containing an atmosphere which is relatively free of oil vapor or mist, means for providing a communication between said upper portion and the atmosphere outside of the bearing-housing, a filter-barrier across the oil-charged atmosphere at said end of the annular space between the races for substantially preventing the passage of oil vapor or mist from said end of the annular space between the races to said chamber, and means for substantially preventing the passage of oil vapor or mist from the other end of the space between the races to said chamber.

4. In combination, an antifriction bearing for a substantially horizontal shaft; said bearing comprising an inner race, an outer race, a plurality of antifriction members between said races, and washer-means disposed at both sides of said antifriction members and extending from one race to the other in such manner as to enclose the space between the races, said washer-means including both washers of impervious material and pervious washers, said pervious washers being pervious to liquid oil but impervious to an oil vapor or mist; lubricating means, exterior to the said bearing, for maintaining a body of liquid oil at a level which, at its lowest operative point, is in substantial alignment with the lowermost inner surface of the outer race, the washers of impervious material having an opening substantially in alignment with said surface and with said level for enabling liquid oil to be supplied to said surface, whereby the liquid oil, supplied only to said surface, is entrained by the antifriction members through the remaining part of the space between the races, and the said antifriction members rotate in a heavily charged atmosphere containing an oil vapor or mist restrained within the space between the races by said pervious washers.

JOHN L. BROWN.